Nov. 17, 1964  J. V. THOMAS  3,157,196
FLOAT OPERATED DEVICE
Filed Aug. 7, 1961  4 Sheets-Sheet 1

INVENTOR.
JOHN V. THOMAS
BY
ATTORNEYS

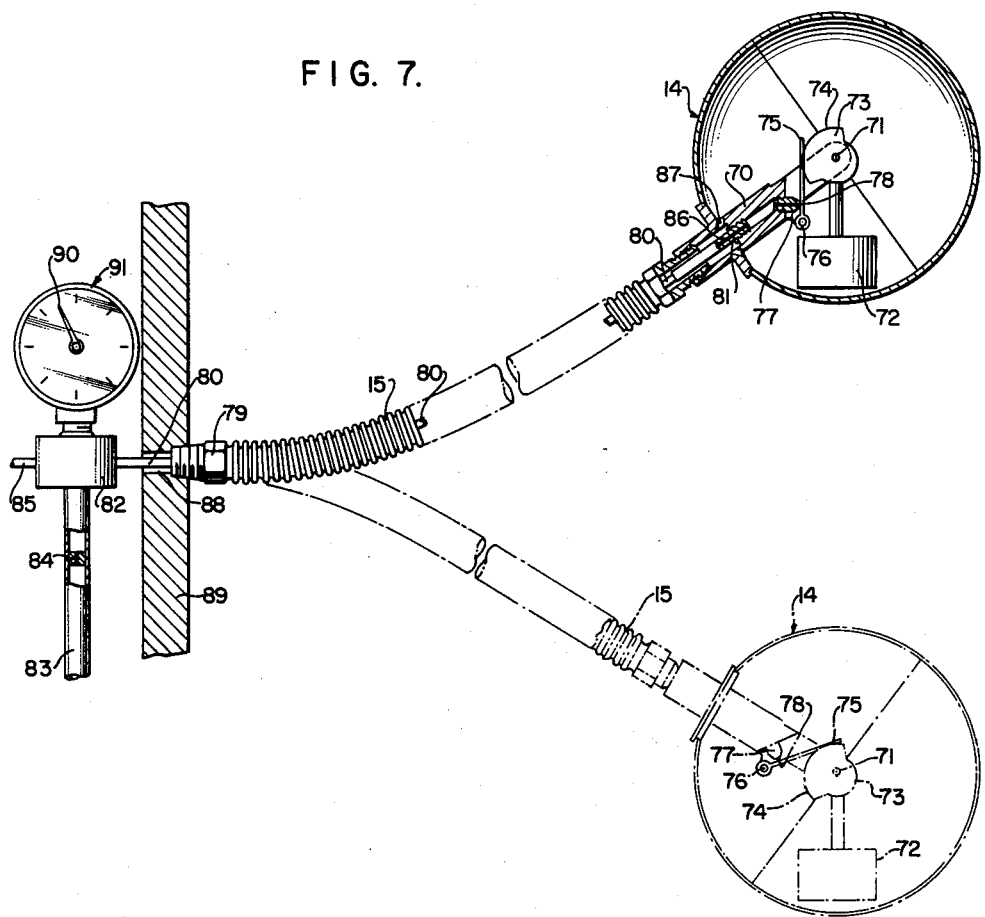
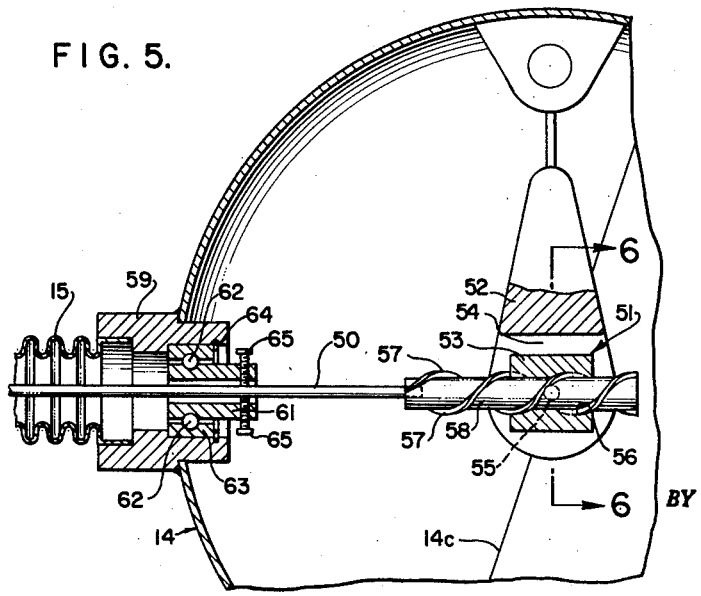
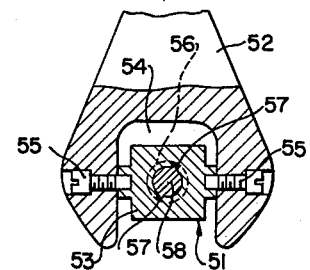

Nov. 17, 1964   J. V. THOMAS   3,157,196
FLOAT OPERATED DEVICE
Filed Aug. 7, 1961   4 Sheets-Sheet 3
FIG. 8.
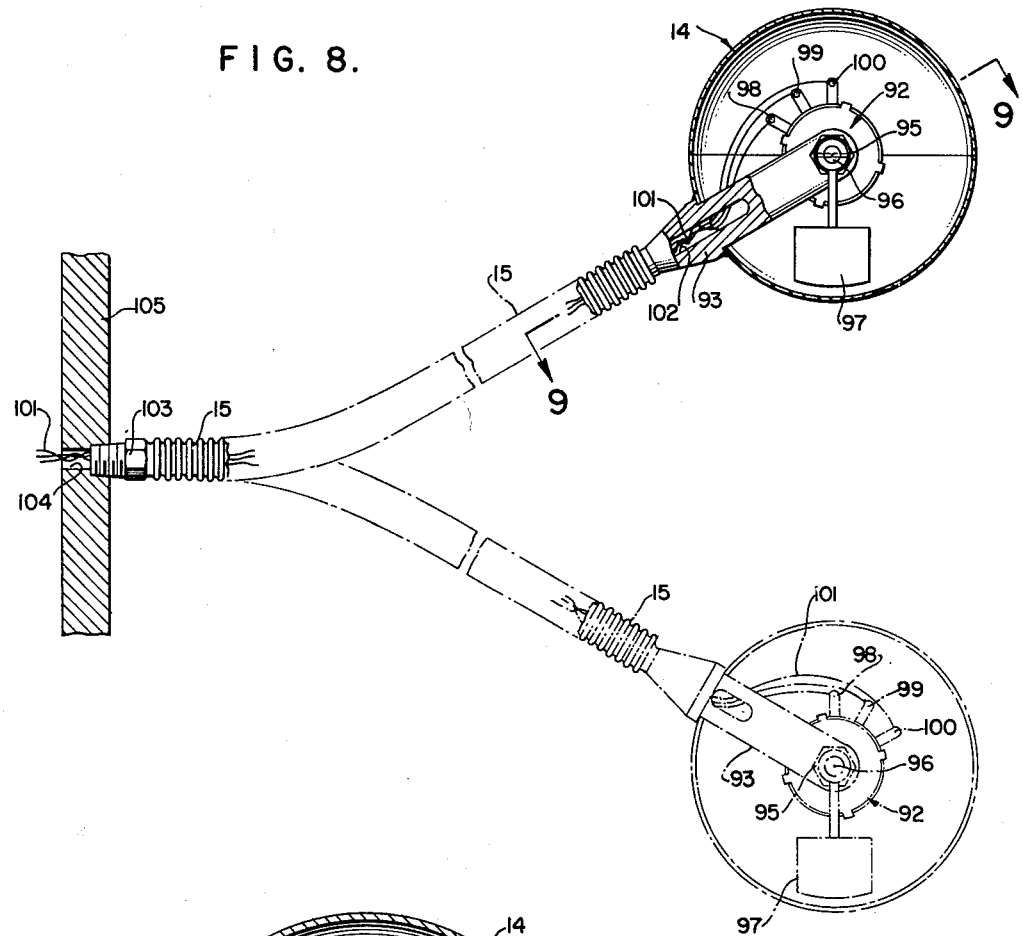
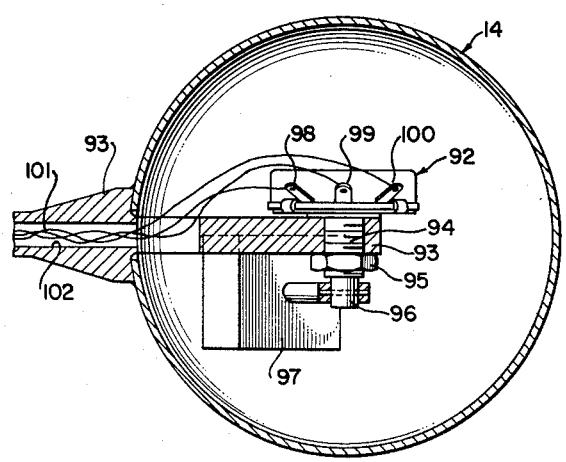
FIG. 9.
INVENTOR.
JOHN V. THOMAS
BY
ATTORNEYS

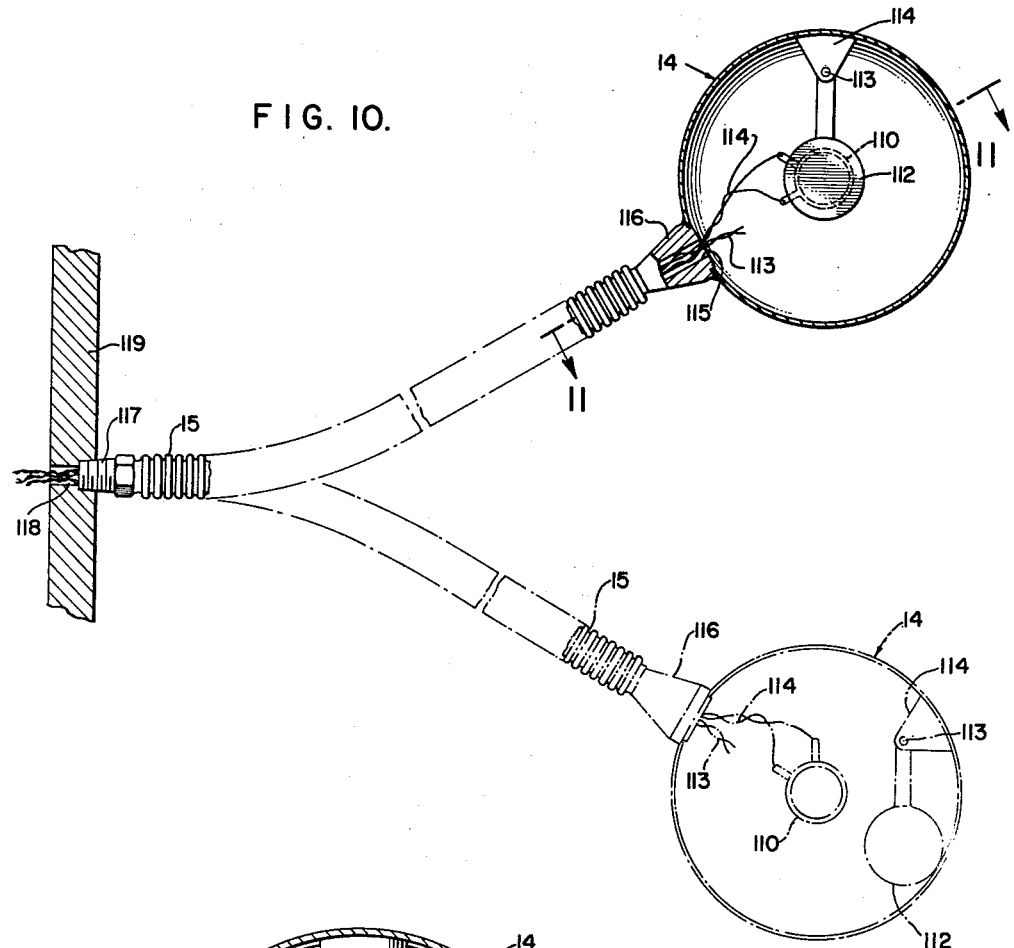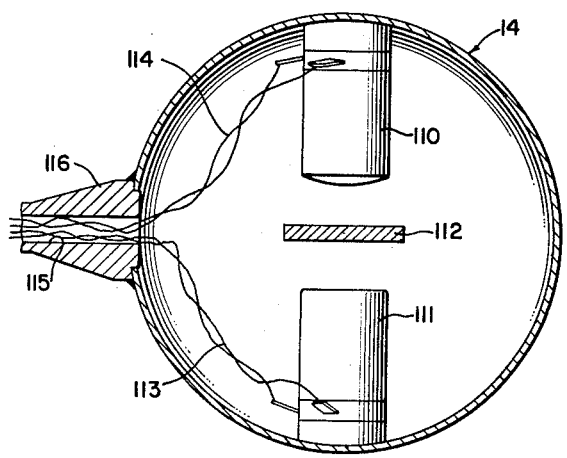
FIG. 10.
FIG. 11.
INVENTOR.
JOHN V. THOMAS
BY
ATTORNEYS

United States Patent Office 3,157,196
Patented Nov. 17, 1964

3,157,196
FLOAT OPERATED DEVICE
John V. Thomas, Box 2297-D, Pasadena, Calif.
Filed Aug. 7, 1961, Ser. No. 129,638
26 Claims. (Cl. 137—434)

This invention relates to a swinging float having an internal gravity-operated device useful for remote actuation of any desired mechanism by means of mechanical, electrical or fluid operated elements.

This invention also relates generally to a means of controlling the level of a liquid in a tank, reservoir or pressure vessel.

More specifically, this invention relates to a novel form of float-actuated device for regulating the level of a liquid.

It is an object of this invention to provide a novel form of float mechanism.

It is a further object of this invention to provide a float-operated device which will operate well under high pressure conditions without the need for stuffing boxes, sliding seals or the like.

It is a further object of this invention to provide a liquid level control device which may be readily adjusted on the job and is foolproof in operation.

Further objects of this invention reside in the details of construction of the device and in the unique cooperative relationships between the component parts thereof.

Other objects and advantages of this invention will become readily apparent upon reading the following specification in conjunction with the accompanying drawings, in which:

FIGURE 5 is a sectional view showing a first modification.

FIGURE 6 is a sectional detail taken on lines 6—6 of FIGURE 5.

FIGURE 7 is a side elevation partly broken away showing a second modification.

FIGURE 8 is a side elevation partly broken away showing a third modification.

FIGURE 9 is a sectional view taken on lines 9—9 as shown in FIGURE 8.

FIGURE 10 is a side elevation partly broken away showing a fourth modification.

FIGURE 11 is a sectional view taken on lines 11—11 as shown in FIGURE 10.

This application is a continuation-in-part of my copending application, Serial No. 63,085, filed October 17, 1960, now abandoned.

Figure 1:
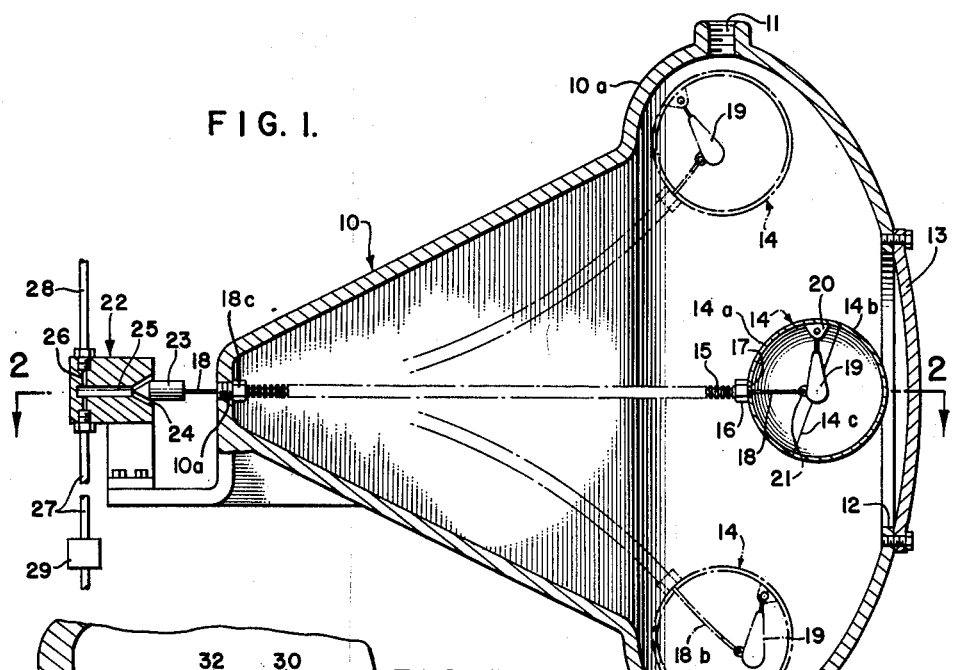
FIGURE 1 is a preferred embodiment of this invention.
Figure 2:
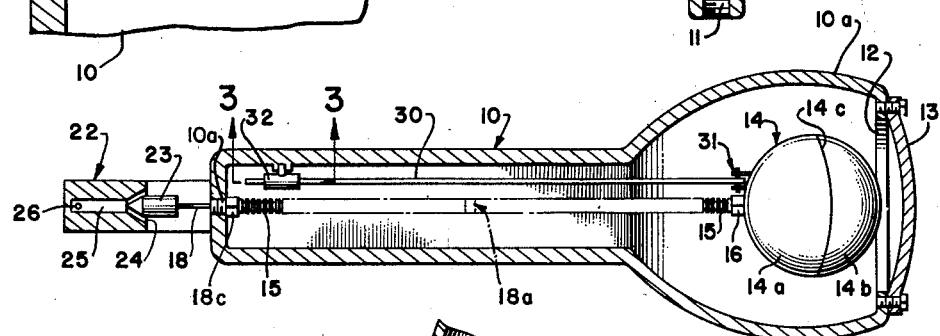
FIGURE 2 is a sectional top view taken substantially along lines 2—2 of FIGURE 1.

Referring to FIGURES 1 and 2, the supporting housing is generally designated 10. The housing has a pair of threaded openings 11 to which pipes (not shown) may be attached to establish communication between the interior of the housing 10 and the interior of a reservoir (not shown). The housing 10 has an opening 12 to provide access to the interior thereof and said opening 12 is normally closed by a detachable cover plate 13.

Figure 4:
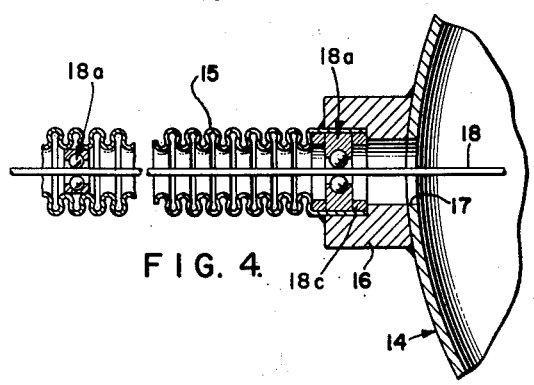
FIGURE 4 is a fragmentary sectional view shown on an enlarged scale.

A hollow float 14 is positioned inside housing 10, and is formed of two hemispheres 14a and 14b joined along a seam 14c. This float is attached to a flexible corrugated tube 15 at one end thereof, and the other end of said flexible tube 15 is attached at 10a to one wall of the housing. The flexible tube 15 takes the form of a metallic bellows and is capable of withstanding considerable pressure within the housing 10. FIGURE 4 shows an enlarged view showing the method of attaching tube 15 to float 14. A ring 16 is welded to the float and the flexible tube is attached to said ring. A flexible metal actuating rod 18 extends coaxially through the tube 15 and aperture 17 and projects into the float. The rod 18 may be guided in friction-reducing bearing assemblies 18a mounted in the tube 15 and end fittings 18b and 18c.

A weight member is positioned within the float 14 and may comprise a pendulum 19 of heavy metal such as iron or lead pivotally attached to the lug 20. The end of the actuating rod 18 is designed to bear against the pendulum 19 and may be pivotally attached thereto as shown at 21. The other extremity of rod 18 projects exteriorly of the housing 10 and is designed to actuate any suitable or desirable pilot valve device, such as the air valve shown diagrammatically at 22. The valve head 23 is attached to rod 18 and is positioned in valve seat 24. Communicating with seat 24 is an air passage 25 which connects with another passage 26. Two air hoses 27 and 28 are attached to the valve housing at each end of passage 26. Air is supplied to hose 27 and the other hose 28 connects to a diaphragm-operated motor valve (not shown). Said motor valve controls the actual flow of liquid into or out of the reservoir in a conventional fashion. The inlet hose 27 is provided with the usual bleed orifice 29.

Figure 3:
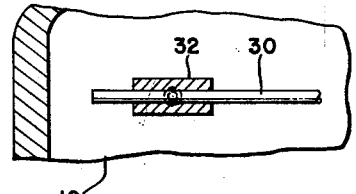
FIGURE 3 is a fragmentary vertical view taken substantially along lines 3—3 of FIGURE 2.

A stabilizer rod 30 may be provided as shown in FIGURES 2 and 3 to insure movement of the float 14 in a vertical plane. The stabilizer rod 30 is pivotally secured to the float by a pin and bracket assembly 31. The other end of said rod is mounted in a pivoted slip guide 32 which allows the rod 30 to move freely with the float 14 in a vertical plane but prevents said float from striking the sides of said housing 10.

The pendulum 19 is mounted within the hemisphere 14 and connected to the actuating rod 18 prior to connecting the hemispheres 14a and 14b together.

In operation, the float 14 may move between the extreme positions shown in phantom lines in FIGURE 1. In the bottom position, corresponding to low liquid level conditions in the reservoir, the pendulum 19 in remaining vertical is seen to have pulled the rod 18 and thus the valve head 23 away from its seat 24, thereby venting the air hose 28 to atmosphere. This reduces the air pressure on the diaphragm-operated valve (not shown) and causes it to admit liquid into the reservoir. As the float 14 rises, following the liquid level in the reservoir, the valve head 23 is moved toward closed position, reducing the effect of the escape of air. The device may be adjusted to shut the valve 22 at any desired liquid level within the housing and thus close the diaphragm motor valve, turning off the flow.

The housing 10 need not encompass the entire structure. The bulbous portion 10a may be eliminated and the device mounted so that the float 14 is positioned directly in the reservoir itself.

In the modified form of my invention shown in FIGURES 5 and 6, the construction of the parts may be the same as previously described except that the actuating rod 50 is mounted to rotate rather than to move axially. A motion converting device generally designated 51 is interposed between the pendulum 52 and the rod 50, so that a change of relative angular position between the pendulum 52 and the float 14 causes the actuating rod 50 to rotate. This is accomplished by mounting a nut 53 within clearance space 54 in the pendulum 52. Aligned pins 55 support the nut for pivotal movement. The internal threads 56 of the nut engage external threads 57 provided on the enlarged end 58 of the actuating rod 50. The threads have a very low helix angle with respect to the axis of the rod 50 so that movement of the nut 53 toward and away from the ring fitting 59 serves to cause a turning movement of the rod 50.

Thrust bearing means are provided within the ring fitting 59 and, as shown on the drawing, this includes a hollow sleeve 61 mounted by ball bearings 62 within an outer race 63. A split retainer ring 64 holds the race 63 in place. Clamping screws 65 on the sleeve 61 engage the actuating rod 50 and serve to connect the sleeve 61 and rod 50 for operation as a unit. The thrust bearing parts and the pivoted nut assembly are each mounted in place within their respective parts of the float prior to joinder of the float hemispheres along the seam 14c.

When this modified form of my invention is employed, a different type of pilot valve (not shown) is used. Such pilot valve is operated by rotary motion rather than axial motion of the control rod.

In a modified form of my invention shown in FIGURE 7 a flanged body 70 is fixed to the float 14 and is provided with a pivot in 71 near the center of the hollow float 14. The pendulum 72 swings from this pivot 71 and this pendulum carries a cam member 73 which swings as a unit with the pendulum. The face 74 of the cam 73 contacts the flapper valve 75 which is pivoted to the body 70 at 76. A nozzle 77 carried by the body 70 has an outlet face 78 contacted by the flapper valve 75. Air or other fluid under pressure is supplied to the nozzle 77 and the rate of escape of such fluid from the nozzle 77 is determined by the position of the flapper valve 75.

Within the flexible tube 15 which connects the body 70 to the terminal fitting 79 is a flexible hose 80 which is connected at one end to the terminal fitting 81 within the body 70 and at the other end to the block 82 outside the chamber in which the hollow float 14 operates. Air or other fluid under pressure is delivered to the supply pipe 83 and passes through the orifice 84 to the block 82. If the hollow float 14 is in elevated position shown in full lines in FIGURE 7, the cam 73 holds the flapper valve 75 tightly against the outlet surface 78 of the nozzle 77 with the result that no fluid can escape through the nozzle 77. Accordingly, all of the fluid supplied through the pipe 83 passes outward through the discharge line 85. However, if the float 14 should be in the lower position shown in phantom lines in FIGURE 7, the cam surface 74 allows the flapper valve 75 to move away from the end 78 of the nozzle 77 with the result that air or other fluid under pressure passes under the tube 80 and through the restriction 86 in the terminal fitting 81 and then into the interior of the hollow float 14 through the nozzle 77. The air or other fluid under pressure then returns via the port 87 in the body 70 and through the interior of the flexible tube 15 and fitting 79 through the opening 88 in the wall 89, and is discharged to atmosphere. From this description it will be understood that the rate of flow of air or other fluid through the nozzle 77 is a function of the height of the float with respect to the stationary parts 79 and 89. A measure of the rate of fluid flow through the nozzle 77 is given by the indicator hand 90 of the pressure gauge 91 connected to the block 82. If desired, the pressure gauge 91 may be calibrated directly in terms of height of liquid within the chamber containing the float 14.

The change in the rate of flow of air through the outlet pipe 85 may be used to operate a conventional pneumatic relay device and thereby control admission and withdrawal of liquid from the chamber within which the hollow float member 14 operates.

In the form of my invention shown in FIGURES 8 and 9, the hollow float 14 contains an electrical device 92 such as, for example, a potentiometer, rheostat or rotary switch. This electrical device 92 is mounted on the body 93 fixed to the float 14 and to the moving end of the flexible tube 15. The electrical device 92 has a threaded stem 94 fixed to the body 93 by means of the clamp nut 95. The device 92 is also provided with a rotary shaft 96 which projects from the threaded stem 94. The pendulum 97 is fixed to the shaft 96 so that vertical movement of the hollow float 14 between the positions shown in FIGURE 8 results in turning movement of the shaft 96. Three electrical terminals 98, 99 and 100 are shown in FIGURES 8 and 9 and three lead wires 101 are connected to these electrical terminals and extend through the bore 102 of the body 93 and through the interior of the flexible tube 15. These lead wires extend through the terminal fitting 103 and the opening 104 in the stationary wall 105. While only three electrical terminals and three lead wires are shown in the drawings it will be understood that a greater number may be employed if desired. In operation, the relative angular movement of the pendulum 97 and body 93 actuated tthe electrical device 92 and the electrical lead wires 101 may be connected to any suitable apparatus for indicating the liquid level or for adding or withdrawing liquid from the chamber within which the hollow float 14 operates.

In the further modified form of my invention shown in FIGURES 10 and 11, photoelectric apparatus is mounted within the hollow float 14. This includes a subminiature light source 110 optically aligned with a subminiature receiver 111. The receiver contains photoelectric apparatus. A disk pendulum 112 is pivoted at 113 to a bracket 114 positioned within the hollow float member 14. When the float member is at a high elevation, as shown in full line in FIGURE 10, the disk pendulum 112 swings to a position between the light source 110 and the receiver 111 so as completely to interrupt the light beam. As the hollow float member moves downward toward the lower position shown in phantom lines in FIGURE 10, the disk pendulum 112 gradually shifts position of exposing more and more of the light beam to the receiver 111. Electrical energy carried by the lead wires 113 reflects this change and this may be used in a conventional manner to indicate the liquid level within the float chamber or to control the inflow and outflow of liquid to the chamber. The lead wires 114 supply electrical energy to the light source 110 and all of the lead wires pass through the bore 115 of the terminal connection 116 and through the flexible tube 115 and terminal fitting 117, and through the aperture 118 in the stationary wall 119.

Having fully described my invention, it is to be understood that I am not to be limited to the details herein set forth, but that my invention is of the full scope of the appended claims.

I claim:

1. In combination: a hollow float, a stationary member, a flexible tube connecting the float to the stationary member, a weight member mounted to move within the interior of the float, and a mechanical element movable through the interior of the flexible tube in accordance with relative movement of the weight member and float occasioned by change in position of the float.

2. In combination: means including a stationary member providing a float chamber, a hollow float in said chamber, a flexible tube connecting the float to the stationary member, a weight member mounted to move within the interior of the float, and a mechanical element movable through the interior of the flexible tube in accordance with relative movement of the weight member and float occasioned by change in elevation of the float within the float chamber.

3. As a subcombination: a hollow float, a flexible tube connected to the float at one end, a weight member mounted to move within the interior of the float, and a mechanical element movable through the interior of the flexible tube in accordance with relative movement of the weight member and float.

4. In combination: a hollow float, a stationary member, a flexible tube connecting the float to the stationary member, a weight member mounted to move within the interior of the float, and means including at least one mechanical element movable through said flexible tube in accordance with relative movement of the weight member and float occasioned by change in elevation of the float.

5. In combination: means including a stationary member providing a float chamber, a hollow float in said chamber, a flexible tube connecting the float to the stationary member, a weight member mounted to move within the interior of the float, and means including at least one mechanical element movable through said flexible tube in accordance with relative movement of the weight member and float occasioned by change in elevation of the float within the float chamber.

6. As a subcombination: a hollow float, a flexible tube connected to the float at one end, a weight member mounted to move within the interior of the float, and means including at least one mechanical element movable through said flexible tube in accordance with relative movement of the weight member and float.

7. In a float operated device for actuating a movable element of a valve assembly to control liquid level in a reservoir, the improvement comprising, in combination: a hollow float, a flexible tube having one extremity attached to said float and the other extremity fixed relative to the valve assembly, the interior of said tube communicating with the interior of said float, a pendulum suspended inside of said float, an actuating rod extending coaxially through said flexible tube, one extremity of said rod projecting into said float and engaging said pendulum, the other extremity of said rod projecting exteriorly of said tube and effective to actuate said movable valve element.

8. In a float operated device for actuating a movable element of a valve assembly to control liquid level in a reservoir, the improvement comprising, in combination: a housing, a hollow float positioned in said housing, a flexible tube having one extremity attached to said float and the other extremity fixed relative to said housing, the interior of said tube communicating with the interior of said float, a pendulum suspended inside of said float, an actuating rod extending coaxially through said flexible tube, one extremity of said rod projecting into said float to engage said pendulum, the other extremity of said rod projecting exteriorly of said tube and said housing and effective to actuate said movable valve element.

9. A device for controlling the level of liquid in a reservoir comprising: a housing, means for communicating the interior of said housing with the interior of said reservoir, a float positioned in said housing, a flexible corrugated tube having one extremity attached to said float and the other extremity fixed relative to said housing, the interior of said tube communicating with the interior of said float, a pendulum suspended in said float, an actuating rod extending coaxially through said flexible tube and having one extremity projecting into said float to engage said pendulum, said rod having its other extremity projecting exteriorly of said housing, a valve having a movable element, said exterior projection of said rod operably attached to said movable valve element to actuate the same, said valve being effective to control the flow of liquid into, or out of, said reservoir.

10. A device of the type described in claim 9 comprising, in addition, a stabilizing rod, said rod having one extremity pivotally attached to said float, a slip guide pivotally affixed to said housing, the other extremity of said rod positioned in said slip guide, said stabilizing rod effective to minimize motion of said float in a horizontal plane.

11. As a subcombination, a float, a flexible corrugated tube attached to said float, a pendulum suspended in said float, an actuating rod extending coaxially through said flexible tube, one extremity of said rod projecting into said float to engage said pendulum and the other extremity of said rod projecting exteriorly of said flexible tube.

12. Float operated control mechanism comprising, in combination: a hollow float, a flexible tube connected to the float, a pendulum suspended within the interior of the float, an actuating rod extending through the tube and into the interior of the float, and means operatively connecting the rod with respect to the pendulum to cause movement of the rod within the flexible tube upon change in relative angular position of the pendulum and the float.

13. Float operated control mechanism comprising, in combination: a hollow float, a flexible tube connected to the float, a pendulum suspended within the interior of the float, an actuating rod extending through the tube and into the interior of the float, and pivotal means operatively connecting the rod with respect to the pendulum to cause axial motion of the rod within the flexible tube upon change in relative angular position of the pendulum and the float.

14. Float operated control mechanism comprising, in combination: a hollow float, a flexible tube connected to the float, a pendulum suspended within the interior of the float, an actuating rod extending through the tube and into the interior of the float, and means operatively connecting the rod with respect to the pendulum to cause rotary motion of the rod within the flexible tube upon change in relative angular position of the pendulum and the float.

15. Float operated control mechanism comprising, in combination: a hollow float, a flexible tube connected to the float, a pendulum suspended within the interior of the float, an actuating rod extending through the tube and into the interior of the float, and means including a motion converting device operatively connecting the rod with respect to the pendulum to cause turning motion of the rod within the flexible tube upon change in relative angular position of the pendulum and the float.

16. Float operated control mechanism comprising, in combination: a hollow float, a flexible tube connected to the float, a rotary thrust bearing assembly carried by the float adjacent its connection to said tube, a pendulum suspended within the interior of the float, an actuating rod extending through the tube and thrust bearing assembly and into the interior of the float, means on an element of said thrust bearing assembly engaging said rod, and means operatively connecting the rod with respect to the pendulum to cause rotary motion of the rod within the flexible tube upon change in relative angular position of the pendulum and the float.

17. Float operated control mechanism comprising, in combination: a hollow float, a flexible tube connected to the float, a pendulum suspended within the interior of the float, an actuating rod extending through the tube and into the interior of the float, a nut pivotally mounted on the pendulum, a screw fixed to said rod and engaging said nut, and thrust bearing means on the float engaging said rod to cause rotary motion of the rod within the flexible tube upon change in relative angular position of the pendulum and the float.

18. In combination: a hollow float, a stationary member, a flexible tube connecting said float to said stationary member, a pendulum suspended within the interior of said float, a fluid supply conduit extending through said tube, means within the float operated by relative swinging movement of the pendulum and the float for controlling rate of flow of fluid through said conduit, and means connecting the interior of the float with the interior of the flexible tube.

19. In combination: a hollow float, a stationary member, a flexible tube connecting the float to the stationary member, a pendulum suspended within the interior of the float, an electrical device within the float operated by relative movement of the pendulum and the float and electrical lead wires extending through the interior of the flexible tube and connected to said electrical device.

20. In combination: a hollow float, a stationary member, a flexible tube connecting the float to the stationary member, a photoelectric device and a light source both within the interior of the float, the light source being adapted to send a beam of light toward said photoelectric device, a pendulum suspended within the interior of the float and movable from a first position interrupting said light beam to a second position out of the path of said light beam, and electrical lead wires extending through said flexible tube and connected to said photoelectric device and to said light source.

21. In combination: a hollow float, a stationary member, a flexible tube connecting the float to the stationary member, a pendulum suspended within the interior of the float and means for continuously transmitting through the interior of the flexible tube the instantaneous relative position of the pendulum and the float occasioned by change in position of the float.

22. In combination: means including a stationary member providing a float chamber, a hollow float in said chamber, a flexible tube connecting the float to the stationary member, a pendulum suspended within the interior of the float, and means for continuously transmitting through the interior of the flexible tube the instantaneous relative positions of the pendulum and float occasioned by change in elevation of the float within the float chamber.

23. As a subcombination: a hollow float, a flexible tube connected to the float at one end, a pendulum suspended within the interior of the float, and means for continuously transmitting through the interior of the flexible tube the instantaneous relative positions of pendulum and float.

24. In combination: a hollow float, a stationary member, a flexible tube connecting the float to the stationary member, a pendulum suspended within the interior of the float, and means including at least one element extending through said flexible tube for continuously transmitting the instantaneous relative positions of the pendulum and float occasioned by change in elevation of the float.

25. In combination: means including a stationary member providing a float chamber, a hollow float in said chamber, a flexible tube connecting the float to the stationary member, a pendulum suspended within the interior of the float, and means including at least one element extending through said flexible tube for continuously transmitting the instantaneous relative positions of the pendulum and float occasioned by change in elevation of the float within the float chamber.

26. As a subcombination: a hollow float, a flexible tube connected to the float at one end, a pendulum suspended within the interior of the float, and means including at least one element extending through said flexible tube for continuously transmitting the instantaneous relative positions of the pendulum and float.

References Cited in the file of this patent

UNITED STATES PATENTS

| | | |
|---|---|---|
| 842,082 | Clayton | Jan. 22, 1907 |
| 2,049,283 | Weckerly | July 28, 1936 |
| 2,136,220 | Sheperd | Nov. 8, 1938 |
| 2,426,930 | Hicks | Sept. 2, 1947 |
| 2,655,574 | Wehrwein | Oct. 13, 1953 |
| 3,014,205 | Boehm | Dec. 19, 1961 |

FOREIGN PATENTS

| | | |
|---|---|---|
| 186,346 | Austria | July 25, 1956 |

OTHER REFERENCES

Germany, 2,6775 II/63C, Apr. 7, 1955.